(12) United States Patent
Kim et al.

(10) Patent No.: US 11,474,330 B2
(45) Date of Patent: *Oct. 18, 2022

(54) OPTICAL IMAGING SYSTEM

(71) Applicant: Samsung Electro-Mechanics Co., Ltd., Suwon-si (KR)

(72) Inventors: Hyuk Joo Kim, Suwon-si (KR); Jin Su Seok, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,427

(22) Filed: Oct. 1, 2020

(65) Prior Publication Data

US 2021/0026113 A1 Jan. 28, 2021

Related U.S. Application Data

(63) Continuation of application No. 16/218,648, filed on Dec. 13, 2018, now Pat. No. 10,830,997, which is a (Continued)

(30) Foreign Application Priority Data

Dec. 5, 2016 (KR) .................. 10-2016-0164493

(51) Int. Cl.
*G02B 13/00* (2006.01)
*G02B 9/64* (2006.01)
*G02B 13/06* (2006.01)

(52) U.S. Cl.
CPC .......... *G02B 13/0045* (2013.01); *G02B 9/64* (2013.01); *G02B 13/06* (2013.01)

(58) Field of Classification Search
CPC ...... G02B 13/0045; G02B 13/06; G02B 9/64; G02B 13/18; G02B 3/04
See application file for complete search history.

(56) References Cited

U.S. PATENT DOCUMENTS 5,745,297 A 4/1998 Kaneko et al.
6,188,522 B1 2/2001 Kimura et al.
(Continued)

FOREIGN PATENT DOCUMENTS

CN 1289938 A 4/2001
CN 102298195 A 12/2011
(Continued)

OTHER PUBLICATIONS

Chinese Office Action dated Nov. 20, 2019, in counterpart Chinese Patent Application No. 201710618652.5 (13 pages in English, 8 pages in Chinese).
(Continued)

*Primary Examiner* — Alicia M Harrington
(74) *Attorney, Agent, or Firm* — NSIP Law

(57) ABSTRACT

An optical imaging system includes a first lens, a second lens, a third lens, a fourth lens, a fifth lens, a sixth lens, and a seventh lens, disposed in order from an object side to an imaging plane. One or any combination of the first lens to the seventh lens are formed of glass. One or both surfaces of one or more of the first lens to the seventh lens are aspherical. A pair of lenses, among the first lens to the seventh lens, allows paraxial areas opposing each other to be bonded to each other.

21 Claims, 2 Drawing Sheets

Related U.S. Application Data continuation of application No. 15/585,304, filed on May 3, 2017, now Pat. No. 10,185,126.

(56) References Cited

U.S. PATENT DOCUMENTS

| | | | |
|---|---|---|---|
| 9,523,841 | B1 | 12/2016 | Chen |
| 9,606,324 | B2 | 3/2017 | Kubota et al. |
| 10,185,126 | B2 | 1/2019 | Kim et al. |
| 10,330,892 | B2 | 6/2019 | Hashimoto |
| 10,830,997 | B2 * | 11/2020 | Kim ................ G02B 13/06 |
| 2007/0139793 | A1 | 6/2007 | Kawada |
| 2010/0277816 | A1 * | 11/2010 | Kweon .............. G02B 13/06 359/755 |
| 2011/0075273 | A1 | 3/2011 | Mizusawa |
| 2011/0317285 | A1 | 12/2011 | Ohashi et al. |
| 2014/0132709 | A1 | 5/2014 | Satoh et al. |
| 2014/0293100 | A1 | 10/2014 | Sasaya |
| 2014/0376105 | A1 | 12/2014 | Sekine |
| 2015/0205070 | A1 | 7/2015 | Lee |
| 2016/0033743 | A1 | 2/2016 | Chen |
| 2017/0045714 | A1 | 2/2017 | Huang |
| 2017/0059832 | A1 * | 3/2017 | Yoshinaga .......... G02B 13/26 |
| 2017/0227733 | A1 * | 8/2017 | Lin .................. G02B 13/006 |
| 2017/0293107 | A1 | 10/2017 | Wang et al. |
| 2017/0307862 | A1 | 10/2017 | Lin et al. |
| 2018/0157007 | A1 | 6/2018 | Kim et al. |

FOREIGN PATENT DOCUMENTS

| | | | | |
|---|---|---|---|---|
| CN | 103703403 | A | | 4/2014 |
| CN | 104793316 | A | | 7/2015 |
| CN | 105319681 | A * | 2/2016 | ......... G02B 13/0045 |
| CN | 207074298 | U | | 3/2018 |
| JP | 2007164079 | | * 6/2007 | ............. G02B 13/06 |
| JP | 4687218 | B2 | | 5/2011 |
| JP | 2011-107425 | A | | 6/2011 |
| JP | 2015-36779 | A | | 2/2015 |
| KR | 10-0799216 | B1 | | 1/2008 |
| KR | 10-2014-0144317 | A | | 12/2014 |
| KR | 10-1483978 | B1 | | 1/2015 |
| WO | WO-2010122882 | A1 * | 10/2010 | ............. G02B 13/06 |

OTHER PUBLICATIONS

Chinese Office Action dated May 26, 2020, in counterpart Chinese Patent Application No. 201710618652.5 (28 pages in English, 14 pages in Chinese).

U.S. Appl. No. 16/218,648, filed Dec. 13, 2018, Hyuk Joo Kim et al., Samsung Electro-Mechanics Co., Ltd.

Chinese Office Action dated Nov. 19, 2020 in counterpart Chinese Patent Application No. 201710618652.5 (18 pages in English and 10 pages in Chinese).

* cited by examiner

OPTICAL IMAGING SYSTEM

CROSS-REFERENCE TO RELATED APPLICATIONS

This application is a continuation of Application Ser. No. 16/218,648 filed on Dec. 13, 2018, now U.S. Pat. No. 10,830,997 issued on Nov. 10, 2020, which is a continuation of Application Ser. No. 15/585,304 filed on May 3, 2017, now U.S. Pat. No. 10,185,126 issued on Jan. 22, 2019, and claims the benefit under 35 USC 119(a) of Korean Patent Application No. 10-2016-0164493 filed on Dec. 5, 2016, in the Korean Intellectual Property Office, the entire disclosures of which are incorporated herein by reference for all purposes.

BACKGROUND

1. Field

The following description relates to an optical imaging system including lenses formed of a glass material.

2. Description of Related Art

Small surveillance cameras may be mounted on a vehicle to capture views to the front and rear of the vehicle. For example, a small surveillance camera may be mounted on a rearview mirror of a vehicle to image moving vehicles, pedestrians, and other objects positioned to the front of the vehicle. A small surveillance camera is used for not only for the purpose of capturing an image of a simple object, but also as a sensor for recognizing the presence or absence of an object.

A surveillance camera used as a sensor requires high resolution, so as to detect fine movement. The resolution of a surveillance camera for a sensor may be improved through an optical system having a high degree of brightness. However, an optical system having an extremely high degree of brightness increases the camera's internal temperature, and thus, the resolution of surveillance camera may be limited. Therefore, the development of an optical imaging system to be used in such a surveillance camera for a sensor having high resolution and uniform resolution, even at a high temperature, is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, and a seventh lens, disposed from an object side and having refractive power. One or any combination of the first lens to the seventh lens are formed of glass. One or both surfaces of one or more of the first lens to the seventh lens are aspherical. A pair of lenses, from among the first lens to the seventh lens, is disposed to allow paraxial areas opposing each other to be bonded to each other.

The optical imaging system can further include a stop disposed between the fourth lens and the fifth lens. The first lens to the seventh lens of the optical imaging system may each be formed of glass. One or both surfaces of the seventh lens can be aspherical in the optical imaging system.

The optical imaging system can include an image-side surface of the fifth lens bonded to an object-side surface of the sixth lens. The first lens and the second lens of the optical imaging system can have a meniscus shape in which image-side surfaces of the first lens and the second lens are concave. The optical imaging system may also include opposing surfaces of the third lens and the fourth lens, which are convex along an optical axis.

The optical imaging system can include the fifth lens having a convex image-side surface along an optical axis. The optical imaging system may include the sixth lens having a concave object-side surface along an optical axis. The optical imaging system can include convex surfaces along an optical axis for both surfaces of the seventh lens.

In another general aspect, an optical imaging system includes a first lens having a negative refractive power, a second lens having a negative refractive power, a third lens having a negative refractive power, and a fourth lens having a positive refractive power. The optical imaging system includes a fifth lens having a positive refractive power, a sixth lens having a negative refractive power, and a seventh lens having a positive refractive power. The first lens to the seventh lens are sequentially disposed from an object side to an imaging plane. One or any combination of the first lens to the seventh lens are formed of glass.

One or both surfaces of the seventh lens can be aspherical in the optical imaging system. The third lens of the optical imaging system may include a concave object-side surface along an optical axis. The fourth lens of the optical imaging system may have a convex object-side surface along an optical axis. Both surfaces of the fifth lens can be convex along an optical axis. Both surfaces of the sixth lens of the optical imaging system may be concave along an optical axis.

In another general aspect, an optical imaging system includes a first lens having a convex object-side surface along an optical axis; a second lens having a convex object-side surface along the optical axis; and a third lens having a convex image-side surface along the optical axis. The optical imaging system also includes a fourth lens, a fifth lens, a sixth lens, and a seventh lens. The first lens to the seventh lens are sequentially disposed from an object side to an imaging plane. One or any combination of the first lens to the seventh lens are formed of glass.

Each of the first lens to the seventh lens may be formed of glass in the optical imaging system. The fourth lens, the fifth lens and the seventh lens of the optical imaging system can each have a positive refractive power. The optical imaging system may have an angle of view that is 150° or more.

Other features and aspects will be apparent from the following detailed description, the drawings, and the claims.

Figure 1:
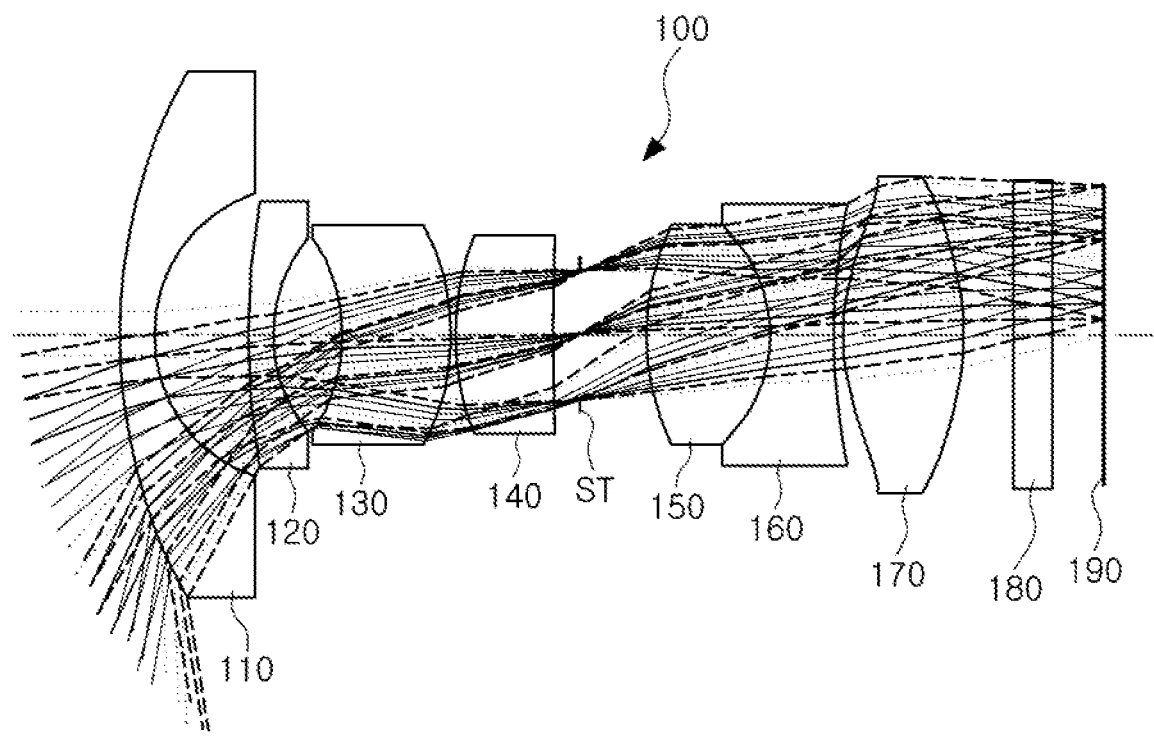
FIG. 1 is a view of an optical imaging system according to a first example.

Throughout the drawings and the detailed description, the same reference numerals refer to the same elements, where applicable. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the present specification, all radii of curvature of lenses, thicknesses, and focal lengths of each lens are indicated in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Further, thicknesses of lenses, gaps between the lenses, OALs, TLs, SLs are distances measured based on an optical axis of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include seven lenses with a refractive power. However, the number of lenses in the optical system may vary, for example, between two to seven lenses, while achieving the various results and benefits described below. Also, although each lens is described with a particular refractive power, a different refractive power for at least one of the lenses may be used to achieve the intended result.

Examples provide an optical imaging system having uniform resolution even in a high temperature environment. Hereinafter, examples are described in further detail with reference to the accompanying drawings. An optical imaging system includes lenses. For example, the optical imaging system includes seven lenses. Next, configurations of respective lenses noted above will be described.

A first lens has a refractive power. For example, the first lens has a negative refractive power. One surface of the first lens is convex. In an embodiment, an object-side surface of the first lens is convex.

The first lens has a spherical surface. For example, both surfaces of the first lens are spherical. The first lens is formed of a material having a high degree of light transmissivity and excellent workability. In an example, the first lens is formed of a glass material. However, a material of the first lens is not limited to being glass. In another example, the first lens may be formed of a plastic material.

The first lens has a refractive index. For example, the refractive index of the first lens is 1.70 or more. The first lens has an Abbe number lower than that of a second lens. In an embodiment, an Abbe number of the first lens may be 50 or less.

A second lens has a refractive power. For example, the second lens has a negative refractive power. One surface of the second lens is convex. In an embodiment, an object-side surface of the second lens is convex.

The second lens has a spherical surface. For example, both surfaces of the second lens are spherical. The second lens is formed of a material having a high degree of light transmissivity and excellent workability. In an example, the second lens is formed of a glass material. However, a material of the second lens is not limited to being glass. In another example, the second lens may be formed of a plastic material.

The second lens has a refractive index. For example, the refractive index of the second lens is 1.550 or less. The second lens has an Abbe number higher than that of the first lens. In an embodiment, an Abbe number of the second lens is 60 or more.

A third lens has a refractive power. For example, the third lens has a negative refractive power. One surface of the third lens is convex. In an embodiment, an image-side surface of the third lens is convex.

The third lens has a spherical surface. For example, both surfaces of the third lens are spherical. The third lens is formed of a material having a high degree of light transmissivity and excellent workability. In an example, the third lens is formed of a glass material. However, a material of the third lens is not limited to being glass. In another example, the third lens may be formed of a plastic material.

The third lens has a refractive index. For example, the refractive index of the third lens is 1.80 or more. The third lens has an Abbe number lower than that of the second lens. In an embodiment, an Abbe number of the third lens is 50 or less.

A fourth lens has a refractive power. For example, the fourth lens has a positive refractive power. One surface of the fourth lens is convex. In an embodiment, an object-side surface of the fourth lens is convex.

The fourth lens has a spherical surface. For example, both surfaces of the fourth lens are spherical. The fourth lens is formed of a material having a high degree of light transmissivity and excellent workability. In an example, the fourth lens is formed of a glass material. However, a material of the fourth lens is not limited to being glass. In another example, the fourth lens may be formed of a plastic material.

The fourth lens has a refractive index. For example, the refractive index of the fourth lens is 1.70 or more. The fourth lens has an Abbe number lower than those of its adjacent lenses (that is, the third lens and the fifth lens). In an embodiment, an Abbe number of the fourth lens is 40 or less.

A fifth lens has a refractive power. For example, the fifth lens has a positive refractive power. One surface of the fifth lens is convex. In an embodiment, an image-side surface of the fifth lens is convex.

The fifth lens has a spherical surface. For example, both surfaces of the fifth lens are spherical. The fifth lens is formed of a material having a high degree of light transmissivity and excellent workability. In an example, the fifth lens is formed of a glass material. However, a material of the fifth lens is not limited to being glass. In another example, the fifth lens may be formed of a plastic material.

The fifth lens has a refractive index. For example, the refractive index of the fifth lens is 1.70 or less. The fifth lens has an Abbe number higher than those of its adjacent lenses (that is, the fourth lens and the sixth lens). In an embodiment, an Abbe number of the fifth lens is 50 or more.

A sixth lens has a refractive power. For example, the sixth lens has a negative refractive power. One surface of the sixth lens is concave. In an embodiment, an object-side surface of the sixth lens is concave.

The sixth lens has a spherical surface. For example, both surfaces of the sixth lens are spherical. The sixth lens is formed of a material having a high degree of light transmissivity and excellent workability. In an example, the sixth lens is formed of a glass material. However, a material of the sixth lens is not limited to being glass. In another example, the sixth lens may be formed of a plastic material.

The sixth lens has a refractive index. For example, the refractive index of the sixth lens is 1.80 or more. The sixth lens may have an Abbe number lower than those of its adjacent lenses (that is, the fifth lens and the seventh lens). In an embodiment, an Abbe number of the sixth lens is 30 or less.

A seventh lens has a refractive power. For example, the seventh lens has a positive refractive power. One surface of the seventh lens is convex. In an embodiment, an object-side surface of the seventh lens is convex.

The seventh lens has an aspherical surface. For example, both surfaces of the seventh lens are aspherical. The seventh lens is formed of a material having a high degree of light transmissivity and excellent workability. In an example, the seventh lens is formed of a glass material. However, a material of the seventh lens is not limited to being glass. In another example, the seventh lens may be formed of a plastic material.

The seventh lens has a refractive index. For example, the refractive index of the seventh lens is 1.60 or more. The seventh lens has an Abbe number higher than that of the sixth lens. In an embodiment, an Abbe number of the seventh lens is 60 or more.

An optical imaging system has one or more aspheric lenses. For example, one or more of the first lens to the seventh lens may have an aspherical surface. As described above, the optical imaging system including one or more aspheric lenses is advantageous for implementing high resolution. For reference, an aspherical surface may be represented by Equation 1 below.

$$Z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} \quad (1)$$

In Equation 1, c represents an inverse of a radius of curvature of the lens, k represents a conic constant, r represents a distance from a certain point on an aspherical surface of the lens to an optical axis, A to H represent aspherical constants, and Z (or SAG) represents a distance between the certain point on the aspherical surface of the lens at the distance r and a tangential plane meeting the apex of the aspherical surface of the lens.

The optical imaging system includes an image sensor. The image sensor is configured to provide high resolution. A surface of the image sensor forms an imaging plane on which an image is focused.

The optical imaging system includes a stop. The stop is disposed between two lenses. For example, the stop may be disposed between the fourth lens and the fifth lens. The stop disposed described above adjusts an amount of light incident on the image sensor.

The stop is configured to divide refractive power of the optical imaging system into two parts. For example, total refractive power of lenses located in the front (an object side) of the stop is negative, and total refractive power of lenses located in the back (an imaging plane side) of the stop is positive. Such an arrangement may be advantageous in reducing an overall length of an optical system while widening an angle of view of an optical imaging system.

The optical imaging system includes a filter. The filter is disposed between the seventh lens and the image sensor to remove a component limiting resolution. For example, the filter may block infrared wavelengths of light. The filter has a refractive index. For example, the refractive index of the filter may be 1.50 or more. The filter has an Abbe number substantially similar to that of the seventh lens. For example, an Abbe number of the filter is 60 or more.

The optical imaging system is configured to significantly reduce a change in a focal length due to a temperature. For example, in the optical imaging system, the fourth lens, the fifth lens, and the seventh lens, having positive refractive power, may have weak refractive power of 3 or more.

The optical imaging system configured as described above has uniform resolution even at a high temperature and a low temperature. Thus, even when the optical imaging system is installed in a place easily exposed to an external environment such as a front bumper and a rear bumper of a vehicle, a clear image may be provided for a user.

In addition, the optical imaging system configured as described above has a wide angle of view of 150 degrees or more. Thus, the optical imaging system may not only be applied to a surveillance camera of a vehicle, but also to a camera requiring a wide angle of view, such as a surveillance camera for a drone.

Next, an optical imaging system, according to an example, will be described. First, a shape of an optical imaging system, according to an example, will be described with reference to FIG. 1. An optical imaging system 100 includes lenses having respective refractive powers. For example, optical imaging system 100 includes a first lens 110, a second lens 120, a third lens 130, a fourth lens 140, a fifth lens 150, a sixth lens 160, and a seventh lens 170.

In the first example, the first lens 110 has a negative refractive power. An object-side surface of lens 110 is convex and an image-side surface of lens 110 is concave. The second lens 120 has a negative refractive power. An object-side surface of lens 120 is convex and an image-side surface of lens 120 is concave. The third lens 130 has a negative refractive power. An object-side surface of lens 130 is concave and an image-side surface of lens 130 is convex. The fourth lens 140 has a positive refractive power. An object-side surface of lens 140 is convex and an image-side surface of lens 140 is concave.

The fifth lens 150 has a positive refractive power. Both surfaces of lens 150 are convex. The sixth lens 160 has a negative refractive power. Both surfaces of lens 160 are concave. The seventh lens 170 has a positive refractive power. Both surfaces of lens 170 are convex.

Optical imaging system 100 includes a stop ST. Stop ST is disposed between fourth lens 140 and fifth lens 150. Stop ST disposed as described above blocks peripheral light causing lateral aberration (coma), astigmatism, rectilinear distortion, and lateral chromatic aberration to improve resolution of optical imaging system 100.

Optical imaging system 100 includes a filter 180. Filter 180 is disposed between seventh lens 170 and an imaging plane 190. Filter 180 blocks infrared light, and prevents foreign objects from penetrating into an imaging plane.

Optical imaging system 100 includes an image sensor. The image sensor forms imaging plane 190 in which light refracted through a lens allows an image to be formed.

Optical imaging system 100 includes cemented lenses. For example, fifth lens 150 and sixth lens 160 are disposed in a configuration to be bonded to each other in optical imaging system 100. A cemented surface of fifth lens 150 and sixth lens 160 is convex toward an image. For example, an image-side surface of the fifth lens 150 may be convex, and an object-side surface of the sixth lens 160 may be concave.

Optical imaging system 100 has a wide angle of view. For example, optical imaging system 100 has an angle of view of 195 degrees. Optical imaging system 100 has a low F number. For example, an F number of optical imaging system 100 is 2.0. For reference, an overall focal length of optical imaging system 100 is 1.9.

Figure 2:
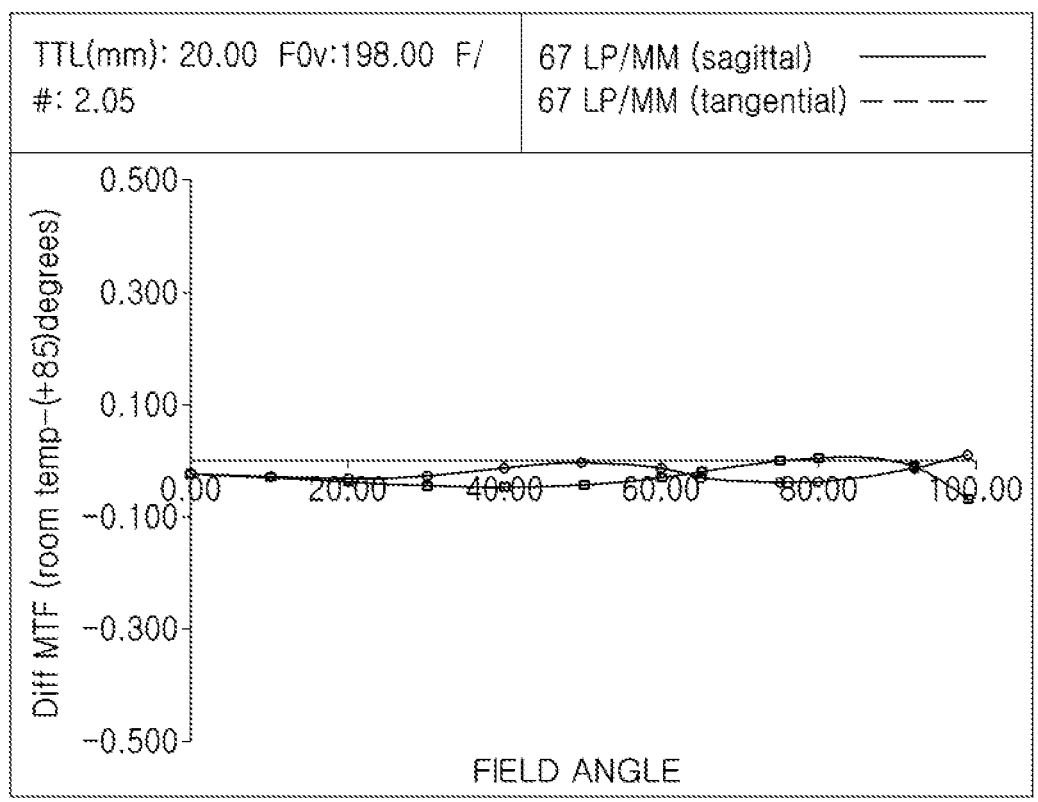
FIGS. 2 and 3 illustrate modulation transfer function (MTF) curves according to a change in a temperature of the optical imaging system illustrated in FIG. 1.
Figure 3:
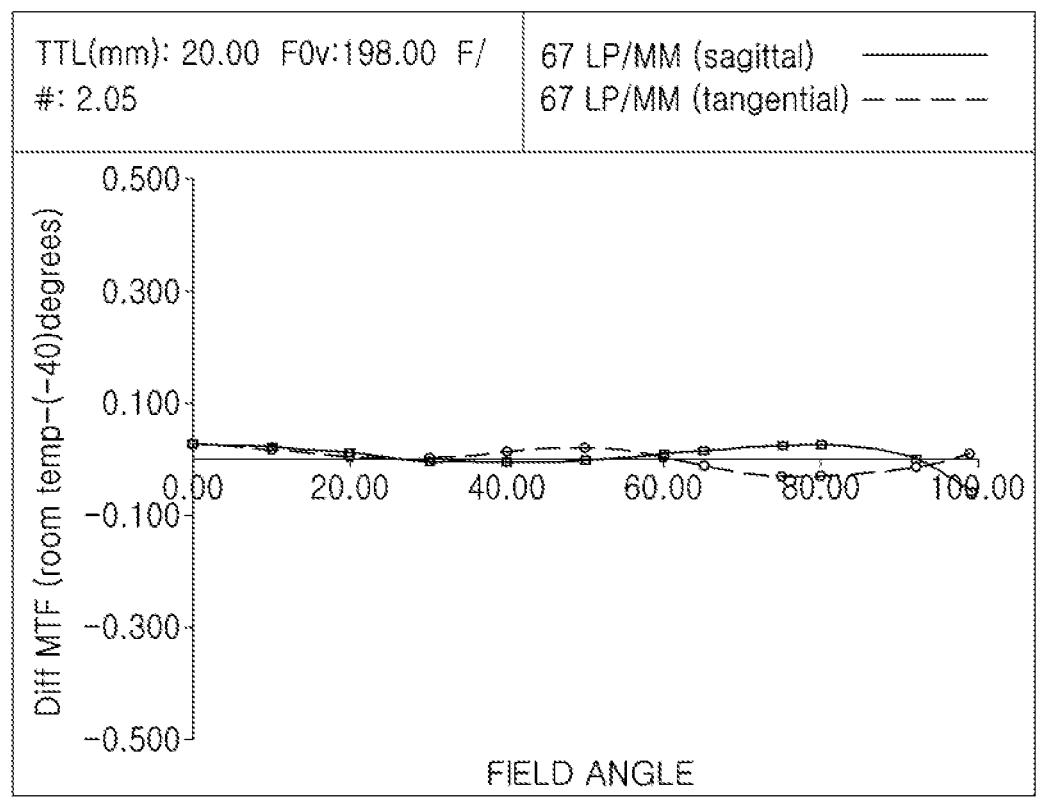

With reference to FIGS. 2 and 3, modulation transfer function (MTF) characteristics of the optical imaging system in a high or low temperature environment will be described. For reference, FIG. 2 is a graph illustrating MTF values of optical imaging system 100, measured in an environment of 85 degrees above zero. FIG. 3 is a graph illustrating MTF values of optical imaging system 100 measured in an environment of 40 degrees below zero.

Optical imaging system 100, according to the first example, has uniform resolution even at a high temperature or at a low temperature. For example, optical imaging system 100 may implement characteristics in which an MTF value is substantially uniform from 0 degree to 94 degrees, which is a center of an optical axis. These characteristics are implemented even in a high-temperature environment of 80 degrees above zero or more, as illustrated in FIG. 2. Similarly, optical imaging system 100 may implement characteristics in which an MTF value is substantially uniform from 0 degree to 98 degrees, which is a center of an optical axis. Again, these characteristics are implemented even in a low-temperature environment of 40 degrees below zero, as illustrated in FIG. 3.

Therefore, the optical imaging system 100, according to the first example, is applied to a camera frequently exposed externally or usually exposed externally to obtain a high-resolution image. As described above, lens characteristics and aspherical characteristics of optical imaging system 100, according to the first example, are listed in Tables 1 and 2 below. The asterisks next to surface numbers S14 and S15 in Table 1 indicate that these surfaces are aspherical.

TABLE 1

| Surface Number | Element | Radius of Curvature | Thickness/ Distance | Refractive Index | Abbe Number | Effective Radius | Focal Length |
|---|---|---|---|---|---|---|---|
| S0 | | Infinity | | | | | |
| S1 | First Lens | 11.0000 | 0.7000 | 1.772 | 49.6 | 5.30 | −5.555 |
| S2 | | 3.0000 | 1.9100 | | | 2.84 | |
| S3 | Second Lens | 14.9600 | 0.5000 | 1.516 | 64.2 | 2.69 | −7.353 |
| S4 | | 2.9920 | 1.4030 | | | 1.95 | |
| S5 | Third Lens | −3.5000 | 2.2010 | 1.804 | 46.5 | 1.95 | −79.649 |
| S6 | | −4.7400 | 0.1000 | | | 2.20 | |
| S7 | Fourth Lens | 5.5000 | 2.0000 | 1.749 | 35.0 | 1.99 | 7.959 |

TABLE 1-continued

First Example

| Surface Number | Element | Radius of Curvature | Thickness/ Distance | Refractive Index | Abbe Number | Effective Radius | Focal Length |
|---|---|---|---|---|---|---|---|
| S8 | | 60.0000 | 0.5430 | | | 1.52 | |
| S9 | Stop | Infinity | 1.3520 | | | 1.30 | |
| S10 | Fifth Lens | 5.1070 | 2.5000 | 1.612 | 58.6 | 2.14 | 3.497 |
| S11 | | −3.0000 | 0.0000 | | | 2.14 | |
| S12 | Sixth Lens | −3.0000 | 1.3000 | 1.805 | 25.4 | 2.21 | −2.933 |
| S13 | | 13.2220 | 0.1870 | | | 2.64 | |
| S14* | Seventh Lens | 4.3580 | 2.4490 | 1.618 | 63.8 | 3.01 | 4.419 |
| S15* | | −5.7450 | 1.0000 | | | 3.20 | |
| S16 | Filter | Infinity | 0.8000 | 1.516 | 64.2 | 3.11 | |
| S17 | | Infinity | 1.0300 | | | 3.09 | |
| S18 | Imaging Plane | Infinity | | | | 3.03 | |

TABLE 2

| Aspherical Constant | S14 | S15 |
|---|---|---|
| K | −2.1298390 | −1.2602675 |
| A | −0.0034231 | 0.0007732 |
| B | 0.0003008 | 0.0000472 |
| C | −0.0000179 | 0.0000017 |
| D | −0.0000005 | −0.0000011 |
| E | −2.1298390 | −1.2602675 |
| F | 0.0000000 | 0.0000000 |
| G | 0.0000000 | 0.0000000 |
| H | 0.0000000 | 0.0000000 |

Figure 4:
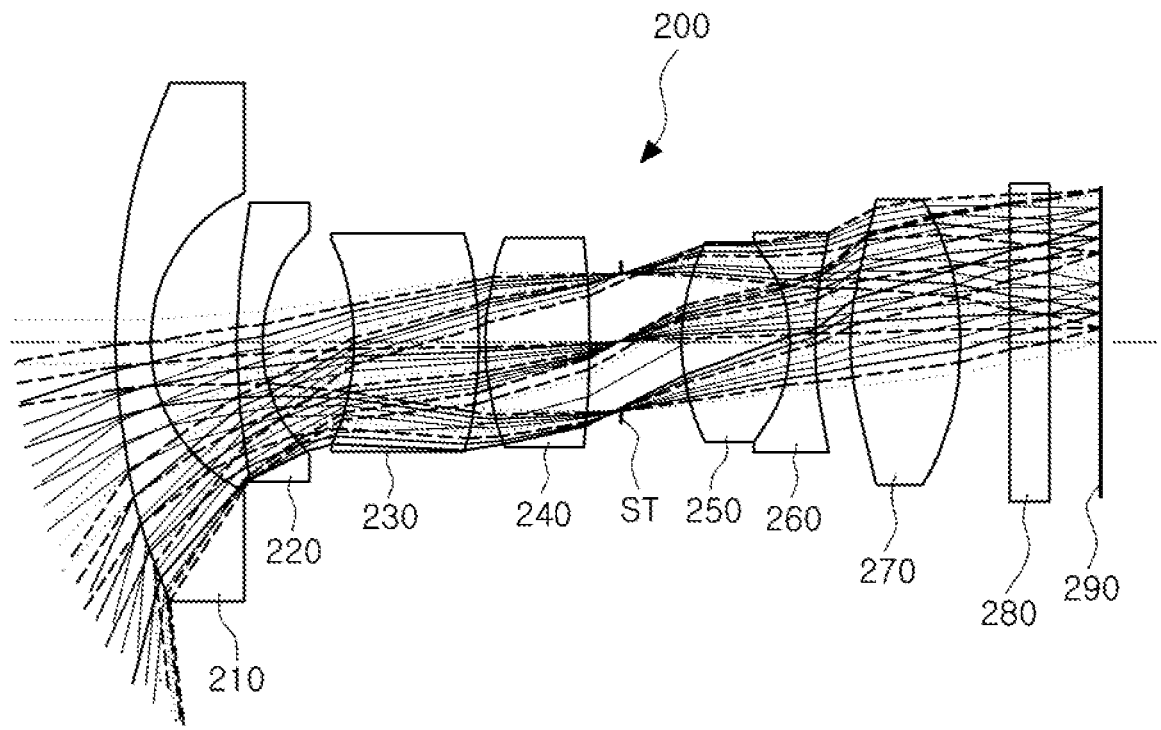
FIG. 4 is a view of an optical imaging system according to a second example.

Next, with reference to FIG. 4, a shape of an optical imaging system according to another example will be described. An optical imaging system 200 includes lenses having respective refractive powers. For example, the optical imaging system 200 includes a first lens 210, a second lens 220, a third lens 230, a fourth lens 240, a fifth lens 250, a sixth lens 260, and a seventh lens 270.

In an example, the first lens 210 has a negative refractive power. An object-side surface of lens 210 is convex and an image-side surface of lens 210 is concave. The second lens 220 has a negative refractive power. An object-side surface of lens 220 is convex and an image-side surface of lens 220 is concave. The third lens 230 has a negative refractive power. An object-side surface of lens 230 is concave and an image-side surface of lens 230 is convex.

The fourth lens 240 has a positive refractive power. Both surfaces of lens 240 are convex. The fifth lens 250 has a positive refractive power. Both surfaces of lens 250 are convex. The sixth lens 260 has a negative refractive power. Both surfaces of lens 260 are concave. The seventh lens 270 has a positive refractive power. Both surfaces of lens 270 are convex.

Optical imaging system 200 includes a stop ST. Stop ST is disposed between fourth lens 240 and fifth lens 250. Stop ST disposed as described above blocks peripheral light causing lateral aberration (coma), astigmatism, rectilinear distortion, and lateral chromatic aberration to improve resolution of optical imaging system 200.

Optical imaging system 200 includes a filter 280. Filter 280 is disposed between the seventh lens 270 and an imaging plane 290. Filter 280 blocks infrared light and prevents foreign objects from penetrating into an imaging plane.

Optical imaging system 200 includes an image sensor. The image sensor forms imaging plane 290, in which light refracted through a lens allows an image to be formed.

Optical imaging system 200 includes cemented lenses. For example, fifth lens 250 and sixth lens 260 are disposed in a configuration to be bonded to each other in optical imaging system 200. A cemented surface of fifth lens 250 and sixth lens 260 is convex toward an image. For example, an image-side surface of fifth lens 250 may be convex, and an object-side surface of sixth lens 260 may be concave.

Optical imaging system 200 has a wide angle of view. For example, optical imaging system 200 has an angle of view of 150 degrees. Optical imaging system 200 has a low F number. For example, an F number of optical imaging system 200 is 2.05. For reference, an overall focal length of the optical imaging system 200 is 1.85. As described above, lens characteristics and aspherical characteristics of optical imaging system 200, according to the second example, are listed in Tables 3 and 4 below. The asterisks next to surface numbers S14 and S15 in Table 3 indicate that these surfaces are aspherical.

TABLE 3

Second Example

| Surface Number | Element | Radius of Curvature | Thickness/ Distance | Refractive Index | Abbe Number | Effective Radius | Focal Length |
|---|---|---|---|---|---|---|---|
| S0 | | Infinity | | | | | |
| S1 | First | 13.0000 | 0.7000 | 1.772 | 49.6 | 5.20 | −5.915 |
| S2 | Lens | 3.3000 | 1.7600 | | | 2.98 | |
| S3 | Second | 14.9600 | 0.4900 | 1.516 | 64.2 | 2.81 | −7.344 |
| S4 | Lens | 2.9900 | 1.8500 | | | 2.18 | |
| S5 | Third | −5.1700 | 2.5300 | 1.804 | 46.5 | 2.03 | −24.734 |
| S6 | Lens | −8.5100 | 0.1500 | | | 2.15 | |
| S7 | Fourth | 6.0300 | 2.1000 | 1.749 | 35.0 | 2.06 | 6.406 |
| S8 | Lens | −19.9900 | 0.6300 | | | 1.68 | |
| S9 | Stop | Infinity | 1.2400 | | | 1.35 | |

TABLE 3-continued

Second Example

| Surface Number | Element | Radius of Curvature | Thickness/ Distance | Refractive Index | Abbe Number | Effective Radius | Focal Length |
|---|---|---|---|---|---|---|---|
| S10 | Fifth | 4.5100 | 2.2000 | 1.612 | 58.6 | 2.05 | 3.312 |
| S11 | Lens | −3.0000 | 0.0000 | | | 2.05 | |
| S12 | Sixth | −3.0000 | 0.5000 | 1.805 | 25.4 | 2.07 | −2.725 |
| S13 | Lens | 8.7700 | 0.7000 | | | 2.26 | |
| S14* | Seventh | 4.7600 | 2.2200 | 1.618 | 63.8 | 2.72 | 4.731 |
| S15* | Lens | −6.2300 | 1.0000 | | | 2.90 | |
| S16 | Filter | Infinity | 0.8000 | 1.516 | 64.2 | 2.98 | |
| S17 | | Infinity | 1.0700 | | | 3.00 | |
| S18 | Imaging Plane | Infinity | 0.0080 | | | 3.11 | |

TABLE 4

| Aspherical Constant | S14 | S15 |
|---|---|---|
| K | −3.814743 | −29.576662 |
| A | −0.003692 | −0.013405 |
| B | 0.000836 | 0.002777 |
| C | −0.000229 | −0.000390 |
| D | 0.000017 | 0.000021 |
| E | −3.814743 | −29.576662 |
| F | 0.000000 | 0.000000 |
| G | 0.000000 | 0.000000 |
| H | 0.000000 | 0.000000 |

As set forth above, according to examples, an optical imaging system has uniform resolution regardless of changes in temperature. While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation.

Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens having a convex object-side surface along an optical axis, a third lens having a convex image-side surface along the optical axis, a fourth lens, a fifth lens, a sixth lens having a negative refractive power and a concave image-side surface along the optical axis, and a seventh lens sequentially disposed in ascending numerical order along the optical axis from an object side of the optical imaging system toward an imaging plane of the optical imaging system,
wherein one or both surfaces of any one or any combination of any two or more of the first lens to the seventh lens are aspherical, and
two neighboring lenses among the first lens to the seventh lenses are disposed to enable paraxial areas of opposing surfaces of the two neighboring lenses to be bonded to each other.

2. The optical imaging system of claim 1, further comprising a stop disposed between the fourth lens and the fifth lens.

3. The optical imaging system of claim 2, wherein a total refractive power of the first lens, the second lens, the third lens, and the fourth lens disposed on an object side of the stop is negative, and
a total refractive power of the fifth lens, the sixth lens, and the seventh lens disposed on an image side of the stop is positive.

4. The optical imaging system of claim 1, wherein any one or any combination of any two or more of the first lens to the seventh lens is made of glass.

5. The optical imaging system of claim 1, wherein either one or both of an object-side surface of the seventh lens and an image-side surface of the seventh lens are aspherical.

6. The optical imaging system of claim 1, wherein an image-side surface of the fifth lens is bonded to an object-side surface of the sixth lens.

7. The optical imaging system of claim 1, wherein the first lens has a meniscus shape in which an image-side surface of the first lens is concave, and
the second lens has a meniscus shape in which an image-side surface of the second lens is concave.

8. The optical imaging system of claim 1, wherein an object-side surface of the fourth lens is convex along the optical axis.

9. The optical imaging system of claim 1, wherein an image-side surface of the fifth lens is convex along the optical axis.

10. The optical imaging system of claim 1, wherein an object-side surface of the sixth lens is concave along the optical axis.

11. The optical imaging system of claim 1, wherein an object-side surface of the seventh lens is convex along the optical axis, and an image-side surface of the seventh lens is convex along the optical axis.

12. An optical imaging system comprising:
a first lens having a negative refractive power;
a second lens having a negative refractive power and comprising a convex object-side surface along an optical axis;
a third lens having a negative refractive power and a convex image-side surface along the optical axis;
a fourth lens having a positive refractive power;
a fifth lens having a positive refractive power;

a sixth lens having a negative refractive power and comprising a concave image-side surface along the optical axis; and a seventh lens having a positive refractive power, wherein the first lens to the seventh lens are sequentially disposed in ascending numerical order along an optical axis from an object side of the optical imaging system toward an imaging plane of the optical imaging system.

13. The optical imaging system of claim 12, wherein either one or both of an object-side surface of the seventh lens and an image-side surface of the seventh lens are aspherical.

14. The optical imaging system of claim 12, wherein an object-side surface of the third lens is concave along the optical axis.

15. The optical imaging system of claim 12, wherein an object-side surface of the fourth lens is convex along the optical axis.

16. The optical imaging system of claim 12, wherein an object-side surface of the fifth lens is convex along the optical axis, and an image-side surface of the fifth lens is convex along the optical axis.

17. The optical imaging system of claim 12, wherein an object-side surface of the sixth lens is concave along the optical axis.

18. The optical imaging system of claim 12, wherein one or any combination of any two or more of the first lens to the seventh lens is made of glass.

19. An optical imaging system comprising:
a first lens having a negative refractive power and a convex object-side surface along an optical axis;
a second lens having a negative refractive power and a convex object-side surface along the optical axis;
a third lens having a negative refractive power and a convex image-side surface along the optical axis;
a fourth lens having a positive refractive power and a convex object-side surface along the optical axis;
a fifth lens having a positive refractive power;
a sixth lens having a negative refractive power; and
a seventh lens having a positive refractive power,
wherein the first lens to the seventh lens are sequentially disposed in ascending numerical order along the optical axis from an object side of the optical imaging system toward an imaging plane of the optical imaging system.

20. The optical imaging system of claim 19, wherein the fifth lens has a convex object-side surface along the optical axis, and a convex image-side surface along the optical axis, the sixth lens has a concave object-side along the optical axis, and a concave image-side surface along the optical axis, and the seventh lens has a convex object-side surface along the optical axis, and a convex image-side surface along the optical axis.

21. The optical imaging system of claim 19, wherein an angle of view of the optical imaging system is 150° or more.

* * * * *